(12) United States Patent
Suryavanshi

(10) Patent No.: US 8,968,436 B2
(45) Date of Patent: Mar. 3, 2015

(54) INCREASE TOUGHNESS OF POLYCRYSTALLINE DIAMOND

(75) Inventor: Abhijit Prabhakar Suryavanshi, Columbus, OH (US)

(73) Assignee: Diamond Innovations, Inc., Worthington, OH (US)

( * ) Notice: Subject to any disclaimer, the term of this patent is extended or adjusted under 35 U.S.C. 154(b) by 359 days.

(21) Appl. No.: 13/330,805

(22) Filed: Dec. 20, 2011

(65) Prior Publication Data

US 2012/0151848 A1 Jun. 21, 2012

Related U.S. Application Data

(60) Provisional application No. 61/425,324, filed on Dec. 21, 2010.

(51) Int. Cl.

| | | |
|---|---|---|
| *B24D 18/00* | (2006.01) | |
| *C22C 26/00* | (2006.01) | |
| *B22F 5/00* | (2006.01) | |
| *B22F 7/06* | (2006.01) | |
| *B24D 99/00* | (2010.01) | |
| *E21B 10/567* | (2006.01) | |
| *E21B 10/573* | (2006.01) | |
| *B01J 3/06* | (2006.01) | |

(52) U.S. Cl.
CPC . *C22C 26/00* (2013.01); *B22F 5/00* (2013.01); *B22F 7/06* (2013.01); *B24D 99/005* (2013.01); *E21B 10/567* (2013.01); *E21B 10/573* (2013.01); *B01J 3/062* (2013.01); *B01J 2203/062* (2013.01); *B01J 2203/063* (2013.01); *B01J 2203/0655* (2013.01); *B01J 2203/0685* (2013.01)
USPC .......................................................... 51/307

(58) Field of Classification Search
CPC ............... B24D 3/01; E21B 10/46; B01J 3/06
See application file for complete search history.

(56) References Cited

U.S. PATENT DOCUMENTS

| | | | |
|---|---|---|---|
| 6,974,624 B2 | 12/2005 | Mulligan | |
| 2005/0050801 A1* | 3/2005 | Cho et al. | ........................ 51/293 |

FOREIGN PATENT DOCUMENTS

| | | |
|---|---|---|
| EP | 0297071 A1 | 12/1988 |
| EP | 297071 A1 | 12/1988 |
| EP | 0699642 | 6/1996 |
| EP | 714719 A1 | 6/1996 |

(Continued)

*Primary Examiner* — Pegah Parvini
(74) *Attorney, Agent, or Firm* — Maria C. Gasaway; Keith G. DeMaggio

(57) ABSTRACT

A cutting element include a substrate and a diamond compact including at least two polycrystalline diamond portions separated by at least one metal carbide foil portion. The cutting element is made by placing diamond powder in a reaction container, placing a thin metal layer in the reaction container above or around the diamond powder and binder, placing additional diamond powder in the reaction container above or around the thin metal layer, and placing a pre-sintered substrate containing binder into the reaction container above all diamond powder and thin metal layer components. The assembled reaction container is put into a reactor and is subjected to a high-temperature high-pressure sintering process. The binder in the pre-sintered substrate sweeps through to sinter the first diamond portion, and then reacts with the thin metal layer to form a metal carbide, and then the binder continues to sweep through to sinter the second diamond portion.

13 Claims, 7 Drawing Sheets

(56) References Cited

FOREIGN PATENT DOCUMENTS

| WO | 2005025805 | A1 | 3/2005 |
| WO | 2006099194 | A2 | 9/2006 |
| WO | 2007089590 | A2 | 8/2007 |
| WO | 2008014003 | A2 | 1/2008 |

* cited by examiner

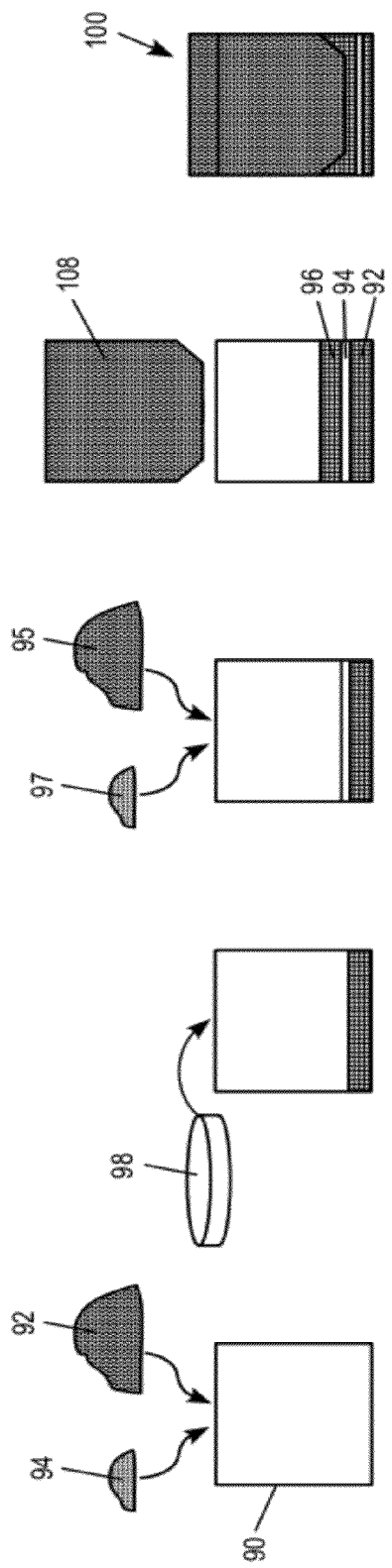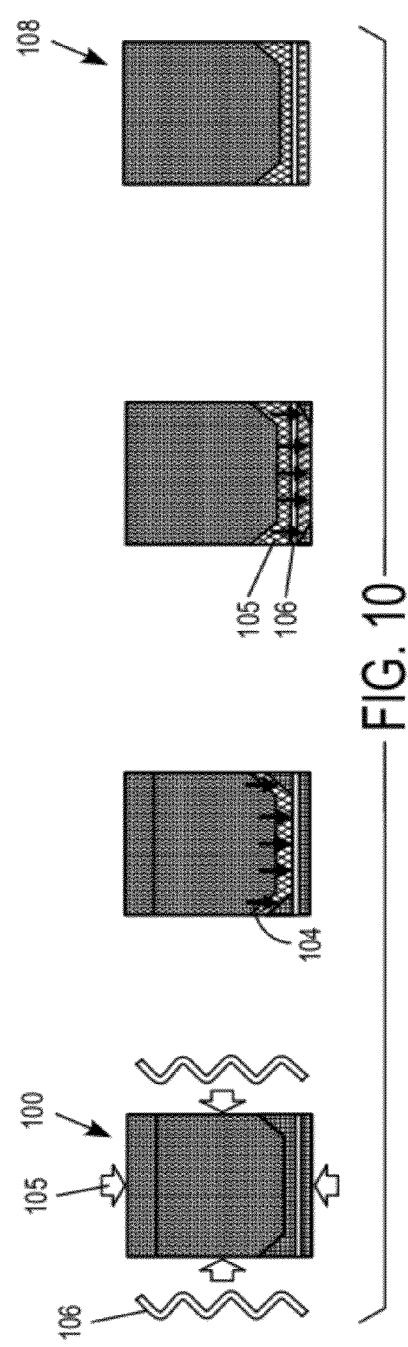

INCREASE TOUGHNESS OF POLYCRYSTALLINE DIAMOND

TECHNICAL FIELD AND INDUSTRIAL APPLICABILITY

The present disclosure relates to polycrystalline diamond (PCD) used in compact cutters and compact cutters thereof. PCD compact cutters usually include a diamond layer or table supported by or joined coherently to a substrate or post or stud. Specifically, the present disclosure relates to PCD with a thin metal layer made of a continuous structure of metal or metal compounds such as a bulk metal foil incorporated in the PCD as continuous or discrete pieces within the diamond prior to sintering. The disclosure also relates to a production method of such diamond and compact cutters including such a diamond.

BACKGROUND

In the discussion of the background that follows, reference is made to certain structures and/or methods. However, the following references should not be construed as an admission that these structures and/or methods constitute prior art. Applicant expressly reserves the right to demonstrate that such structures and/or methods do not qualify as prior art.

Currently available cutters include a PCD layer or table supported by or joined coherently to a substrate, post or stud that is generally made of tungsten carbide. Tungsten carbide is generally selected for the substrate because of its excellent mechanical properties like abrasion resistance and compressive strength.

Bonding the diamond layer to the substrate generally occurs during the sintering stage of the diamond layer at high-pressure high-temperature (HPHT). The sintered PCD layer is composed of diamond particles with extensive amounts of direct diamond-to-diamond bonding or contact as the major phase. In the interstices of the diamond particles, for example, the triple grain pockets or grain boundaries, there is a binder phase which is also called the metal phase or the catalyst solvent phase. This secondary phase also forms a network intermingled with the diamond network. The binder phase serves as the catalyst or solution to the growth of the diamond-to-diamond bonding. The binder phase generally includes at least one active metal, for example, but not limited to, cobalt (Co), nickel (Ni), and iron (Fe).

Additional minor phases generally form either in the binder phase or between the binder phase and the diamond particles. These phases may include the metal carbides formed during the sintering process. These phases can form isolated islands and embed in the binder phase without clear boundaries, which can increase crack propagation within the diamond table.

A process generally used for sintering the currently available cutting elements is the HPHT process, an example of which is shown in FIGS. 11 and 12. Specifically, the process includes adding diamond particles 112 and optional sintering aids 114 to a metal container 110. Then, a carbide stud 118, generally tungsten carbide (WC), is inserted into the metal container 110 in contact with the diamond feed 116 including optional sintering aids. The assembly 120 including the container 110, diamond feed 116 and carbide stud 118 is subjected to the HPHT process. During the HPHT process, the binder originally present in the carbide stud will be molten and squeezed into the diamond compact due to the high temperature 124 and pressure 122. The flow of the binder phase is also called sweep due to the fact that molten binder (arrows 126 representing direction of molten binder) will form a front face 128 while infiltrating, which carries binder and other materials from the stud to the diamond feed.

When the diamond is submerged or surrounded by the sweeping binder phase, the diamond sintering takes place via the liquid-sintering mechanism of solution-transportation-reprecipitation. Here the diamond-to-diamond bonding is formed and the network of diamond is built. Thus, after sintering, a compact 100 is formed having a diamond layer 102 and a carbide stud 104 bonded together at an interface.

The binder from the stud also carries certain amounts of dissolved species from the stud into the diamond layer. The amount of the species depends strongly upon the pressure and temperature. Species that are carried with the binder include, for example, tungsten and carbon. The dissolved tungsten will react with solvent metal and/or carbon from the diamond feed and carbide stud. Depending on the pressure, temperature, and the composition, the reaction products might stay in the binder phase as solid solution species or precipitate out as carbide-based phases after cooling down to room temperature when the process is finished. This binder phase and other precipitated minor phases remain in the sintered diamond layer in between the grains and form a network.

Further, in drilling applications, PCD cutters are subjected to high impact loads which may lead to chipping and spalling of the cutters. The spalls originate from microcracks generated at high stress points. If these cracks reach a tougher phase within the PCD, they may be deflected or arrested, thus improving the impact toughness of the PCD. Several methods have been proposed to provide this improved impact toughness. For example, U.S. Pat. No. 6,974,624 demonstrates a PCD-WC composite cutter wherein PCD is enclosed in honeycomb-like WC shells. Further, European Patent Number 0 699 642 discloses that PCD is reinforced with fibers to improve impact toughness. If the fibers survive the sintering process, they act as a tough phase within PCD and arrest or deflect cracks within the PCD. However, none of the prior art solves all of the disadvantages of a traditional diamond layer for a cutter formed during a sintering process.

SUMMARY

The disclosed method of production produces PCD and cutters containing the PCD with improved impact toughness and fracture resistance at least by incorporating a thin metal layer made of a continuous structure of metal or metal compounds such as metal foils in the PCD prior to sintering.

A first aspect of the invention includes a diamond compact, including at least two polycrystalline diamond (PCD) portions separated by at least one metal carbide foil portion.

A second aspect of the invention includes a cutting element including a substrate and a diamond table including at least two polycrystalline diamond (PCD) portions and at least one thin metal layer portion separating two diamond portions.

A third aspect of the invention includes a method of making a cutting element including placing diamond powder in a reaction container, placing thin metal layer in the reaction container above or around the diamond powder and binder, placing additional diamond powder in the reaction container above or around the thin metal layer, and placing a pre-sintered substrate containing binder into the reaction container above all diamond powder and thin metal layer components. The assembled reaction container is put into a reactor and is subjected to a high-temperature high-pressure (HTHP) sintering process.

It is to be understood that both the foregoing general description and the following detailed description are exemplary and explanatory and are intended to provide further explanation of the invention as claimed.

BRIEF DESCRIPTION OF THE DRAWINGS

The following detailed description can be read in connection with the accompanying drawings in which like numerals designate like elements and in which:

FIG. 9 is a pictorial representation of an exemplary assembly step for producing the cutter of FIG. 1.

FIG. 10 is a pictorial representation of an exemplary sintering step for producing the cutter of FIG. 1.

DETAILED DESCRIPTION

Disclosed is an improved polycrystalline diamond (PCD) and improved cutter containing the improved PCD as a top layer or table of the cutter. Such cutters can be used as, for example, but not limited to, superabrasive cutting elements used in drag bits. The improved PCD includes, among other improvements, better impact toughness and fracture resistance, which can lead to increased life of cutters containing the improved PCD. The improvement in better impact toughness and fracture resistance is at least partially contributed to the addition of at least one thin metal layer in the diamond layer prior to sintering.

Figure 1:
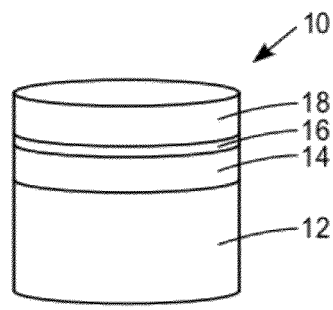
FIG. 1 shows a perspective view of a cutter according to a first embodiment of the invention.

A first embodiment of a cutter containing the improved PCD is illustrated in FIG. 1. The cutter 10 includes a substrate 12, a first diamond layer 14, a foil layer 16, and a second diamond layer 18. The foil layer 16 is a metal layer separating the first and second diamond layers (14, 18) prior to sintering. During the sintering process the binder element sweeps into the foil layer 16. As the binder element reacts with the metal foil layer, the metal layer is converted into a metal compound. The reaction process allows the binder to move through the metal foil and continue the sweep process on the other side of the foil. The kinetics and end products of the reaction process depend on the elements and compounds taking part in the reaction process. As a particular example of the reaction process, a binder such as cobalt with carbon dissolved in it will react with tantalum foil to form tantalum carbide. As the reaction proceeds, the cobalt rich reaction front advances through the tantalum foil and deposits tantalum carbide in its wake. Eventually, the cobalt rich front will emerge from the other side of the foil and continue to sweep through the diamond powder.

The metal carbide foil portion may be placed such that an equal amount of diamond is present on either side of the metal carbide foil portion, or, alternatively, the metal carbide foil portion may be placed such that the diamond portion below or above the metal carbide foil portion is larger.

In some embodiments, the foil layer acts as a filter during the sintering stage. When the binder sweeps through the foil, elements dissolved in the binder such as tungsten and other additives will reach with the foil material. Their concentration in the binder is thus reduced and subsequently the PCD will have a decreased amount of precipitates such as tungsten carbide, which can improve the facture toughness of PCD. Further, the resulting metal/metal carbide layer incorporated in the diamond table provides the diamond table with a tougher phase, which may deflect or arrest microcracks generated at high stress points. By deflecting or arresting microcracks, the foil layer provides the diamond table with improved impact toughness by reducing spalling that originates from such microcracks. Such improved impact toughness and reduced spalling may lead to improved cutter life.

In certain embodiments, the substrate includes substrate material such as a carbide. Exemplary carbides include tungsten carbide, titanium carbide, or tantalum carbide, or combinations thereof. A particular carbide for use as a substrate is tungsten carbide. The substrate may further include minor percentages of additives such as cubic carbides, for example, niobium carbide, vanadium carbide, hafnium carbide, chromium carbide, and zirconium carbide.

The substrate further includes a binder incorporated with the substrate material. The substrate prior to assembly and sintering with the other layers of the cutter is pre-formed into a sintered stud formed of the substrate material and binder pressed into the desired shape of the stud. During the sintering stage, some of the binder from the sintered stud will sweep into the diamond layers and the thin metal layer.

The binder element may be any known in the art as a binder for PCD and for the substrate material, including, for example, carbides. Exemplary binder elements include metals such as cobalt, nickel, iron, or an alloy containing one or more of these metals as well as metalloids such as silicon. In certain embodiments, the binder element includes cobalt. The binder elements may further include any known additives used in the binder phase of carbides and/or superabrasive materials. Additives can include transition metals selected from groups IVB to VIIIB, for example, chromium, molybdenum, magnesium, vanadium, titanium, zirconium, hafnium, niobium, or tantalum or combinations thereof. IN certain embodiments, the additives can include chromium, molybdenum, or vanadium or combinations thereof.

The thin metal layer includes transition metals including, for example, refractory metals such as tantalum, molybdenum, niobium, titanium, zirconium, tungsten, vanadium, or chromium or combinations thereof. Refractory metals do not melt and sweep through the diamond at the sintering temperature. The choice of the metal can depend on its reaction rate with cobalt at the sintering temperature when cobalt is used as the binder material in the sintered stud. In certain embodiments, the thin metal layer includes, for example tantalum, molybdenum, niobium, or zirconium or combinations thereof. A particular metal for use as a thin metal layer is tantalum. The thin metal layer may be a continuous thin sheet such as a metal foil or it may be formed from metal powder. Where metal powder is used, the powder may be mixed with a pressing agent and pressed into a desired shape prior to placement in the diamond feed prior to sintering. The pressing agent may include any binder material typically used to form green bodies of metal powder. Exemplary pressing agents include wax or polyethylene glycol (PEG). Such pressing agents are burned off prior to sintering.

In certain embodiments, the thin metal layer and resulting metal carbide foil has a thickness from about 0.00001 to about 0.010 inches. In more certain embodiments, the thickness is from about 0.0005 to about 0.005 inches. In yet more certain embodiments, the thickness is from about 0.001 to about 0.002 inches.

Figure 2A:
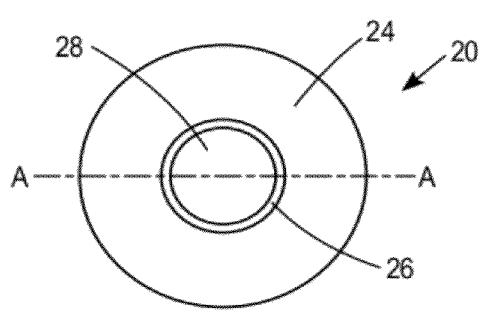
FIG. 2A shows a top view of a cutter according to a second embodiment of the invention.

FIGS. 2A-8 and 13-15B illustrate additional embodiments having different configurations and placements of metal carbide foil portions between diamond portions. Any description of compositions or size of the thin metal layer, substrate or diamond portions described above equally pertain to any of the below described embodiments. FIGS. 2A and 2B illustrate a second embodiment of a cutting element. Cutting element 20 includes a substrate 22, a first diamond portion 24, a metal carbide foil portion 26, and a second diamond portion 28. The first diamond portion 24 is in direct contact with the substrate 22 and surrounds the metal carbide foil portion 26, which further surrounds the second diamond portion 28. In this configuration during sintering, molten binder in the substrate 22 sweeps throughout the first diamond portion 24 and begins to react with the thin metal layer until it is converted to metal carbide. After metal carbide is formed, the molten binder is able to pass through the foil portion to begin sintering the second diamond portion 28. The metal carbide foil portion 26 acts as a filter such that fewer substrate particles reach the second diamond portion 28 compared to the first diamond portion 24. Further, the metal carbide foil portion 26 toughens the diamond portion and reduces propagation of cracks.

Figure 3:
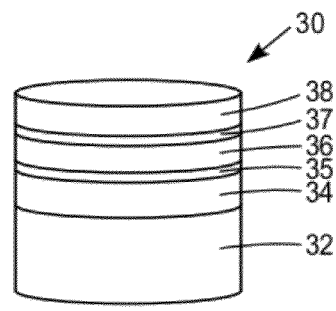
FIG. 3 shows a perspective view of a cutter according to a third embodiment.

FIG. 3 illustrates a third embodiment of a cutting element. Cutting element 30 includes a substrate 32, a first diamond portion 34, a first metal carbide foil portion 35, a second diamond portion 36, a second metal carbide foil portion 37, and a third diamond portion 38. Similar to the first embodiment, during the sintering phase, molten binder from the substrate 32 sweeps through the first diamond portion 34, then reacts with the first thin metal layer. Then after conversion to metal carbide, the molten binder sweeps through the first metal carbide foil portion 35 to sinter the second diamond portion 36 before contacting and reacting with the second thin metal layer. Then after conversion to metal carbide, the molten binder sweeps through the second metal carbide foil portion 37 to sinter the third diamond portion 38.

In further embodiments, the vertical alternating diamond portions and metal carbide foil portions may be repeated such that there are more than three diamond portions and more than two metal carbide foil portions. In yet further embodiments, there are five or more diamond portions and four or more metal carbide foil portions. In still further embodiments, any number of diamond portions and metal carbide foil portions may be added. The actual number may be limited by the size of the cutting element as well as the thickness of the individual portions.

Any embodiments where more than one metal carbide foil portion is present, the multiple metal carbide foil portions may be all identical, all different, or a combination thereof. Metal carbide foil portions may be different in size, shape, or composition, which includes differences in the metal used in the foil or in the additives or pressing aid added to the metal. Also, the metal carbide foil portions may be placed such that an equal amount of diamond is present on either side of each of the metal carbide foil portions, or, alternatively, the metal carbide foil portions may be placed such that the diamond portion below or above each of the metal carbide foil portions is larger.

Figure 4A:
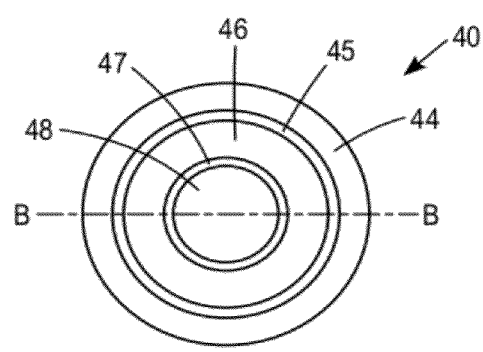
FIG. 4A shows a top view of a cutter according to a fourth embodiment of the invention.
Figure 2B:
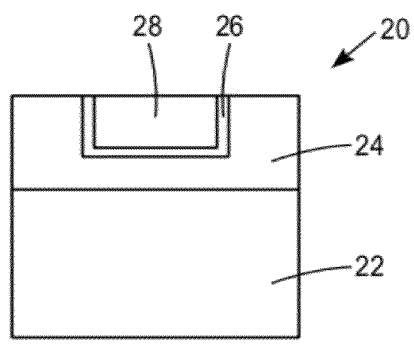
FIG. 2B shows a cross sectional view of the cutter of FIG. 2A cut along line A-A.
Figure 4B:
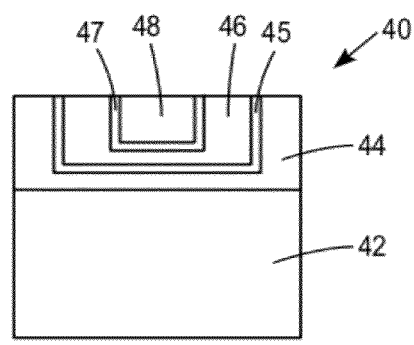
FIG. 4B shows a cross sectional view of the cutter of FIG. 4A cut along line B-B.

FIGS. 4A and 4B illustrate a fourth embodiment of a cutting element. Cutting element 40 includes a substrate 42, a first diamond portion 44, a first metal carbide foil portion 45, a second diamond portion 46, a second metal carbide foil portion 47, and a third diamond portion 48. The diamond portions and metal carbide foil portions are nested such that each portion from the first diamond portion to the third diamond portion surrounds the later portion. This nesting is created by forming thin metal layer cups which are placed within the previously laid diamond powder with latter added diamond powder being added to the thin metal layer cup. In this manner, similar to the second embodiment, during the sintering phase, molten binder from the substrate 42 sweeps through the first diamond portion 44 so as to form a sintered diamond portion surrounding the first thin metal layer. Once the molten binder reaches and reacts with the first thin metal layer to form the first metal carbide foil portion 45, the molten binder passes through the first metal carbide foil portion to sinter the second diamond portion 46. Once the molten binder reaches and reacts with the second thin metal layer to form the second metal carbide foil portion 47, the molten binder passes through the second metal carbide foil portion 47 to sinter the third diamond portion 48.

In further embodiments, the nesting of metal carbide foil portions filled with diamond portions can be repeated such that more than three diamond portions are present and more than two metal carbide foil portions are present. In yet further embodiments, the nesting can include five or more diamond portions and four or more metal carbide foil portions. In still further embodiments, any number of diamond portions and metal carbide foil portions may be nested. The actual number may be limited by the size of the cutting element as well as the thickness of the individual portions. Embodiments including nesting of diamond and metal carbide foil portions in accordance with the fourth embodiment described above can be nested as illustrated in FIGS. 4A and 4B where the diamond portions are surrounds on all sides except the top surface. Alternatively, the diamond portions may be completely surrounded by the outer diamond portion separated by a metal carbide foil portion. Although the nesting described above is illustrated by the metal carbide foil portion forming a cup shape, any shape that surrounds a diamond portion may be substituted for the illustrated cup shape. Also, the size of each cup or interior volume of each metal carbide foil portion between that metal carbide foil portion and an interior metal carbide foil portion can be kept equal, progressively getting smaller or lager for each interior metal carbide foil portion, or some combination thereof.

Figure 5:
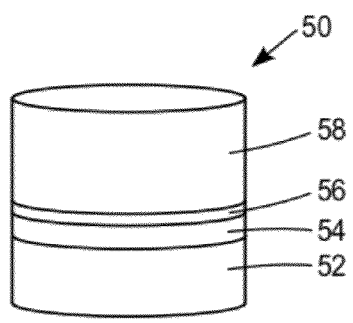
FIG. 5 shows a perspective view of a cutter according to a fifth embodiment of the invention.

FIG. 5 illustrates a fifth embodiment of a cutting element. Cutting element 50 includes a substrate 52, a first diamond portion 54, a metal carbide foil portion 56, and a second diamond portion 58. In this embodiment, the metal carbide foil portion 56 is placed close to the diamond substrate interface so that the majority of the diamond in the cutting element is present in the second diamond portion 58, which contains less substrate particles based on the filtering function of the metal carbide foil portion 56.

Figure 6A:
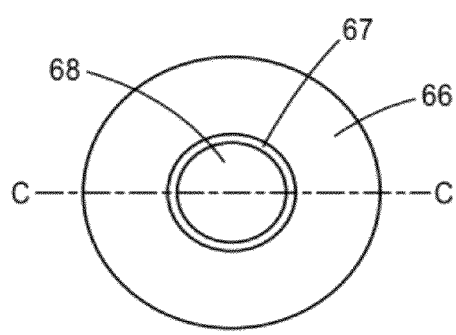
FIG. 6A shows a top view of a cutter according to a sixth embodiment of the invention.
Figure 6B:
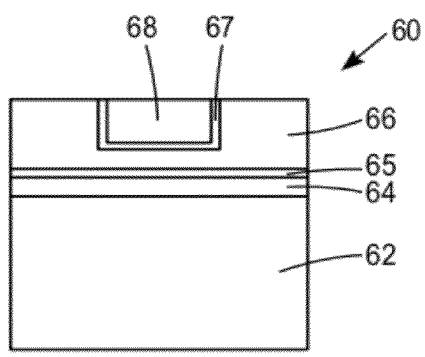
FIG. 6B shows a cross sectional view of the cutter of FIG. 6A cut along line C-C.
Figure 11:
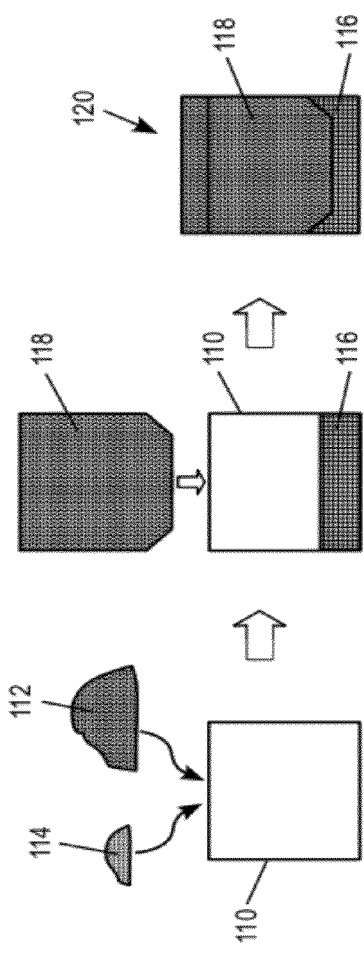
FIG. 11 is a pictorial representation of an assembly step for producing prior art cutters.
Figure 12:
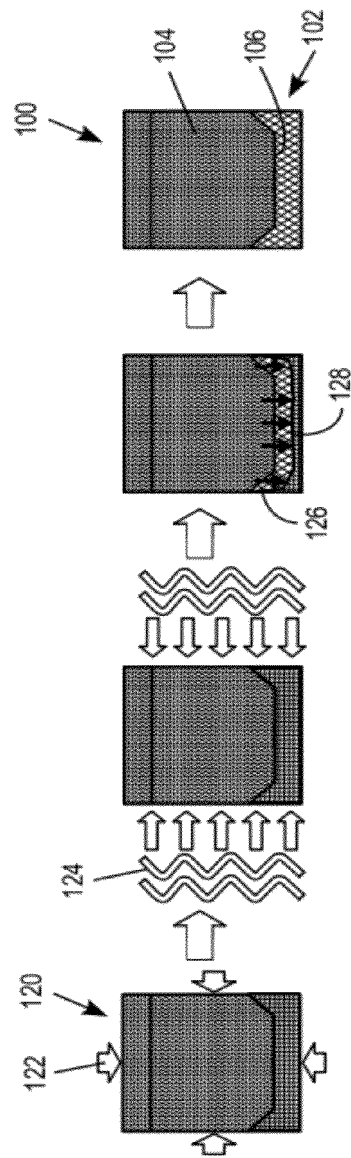
FIG. 12 is a pictorial representation of a sintering step for producing prior art cutters.

FIGS. 6A and 6B illustrate a sixth embodiment of a cutting element. Cutting element 60 includes a substrate 62, a first diamond portion 64, a first metal carbide foil portion 65, a second diamond portion 66, a second metal carbide foil portion 67, and a third diamond portion 68. In this embodiment, the first metal carbide foil portion 65 is planar similar to the first, third, and fifth embodiments, while the second metal carbide foil portion 67 has a cup shape similar to the second and fourth embodiments. All of the alternatives explained above for the first five embodiments can also be used for this embodiment, including, for example, the cutting element may contain multiple planar metal carbide foil portions and/or multiple metal carbide foil portions that surround interior diamond portions.

Figure 7:
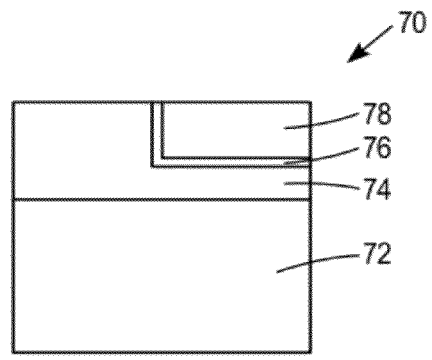
FIG. 7 shows a cross sectional view of a cutter according to a seventh embodiment of the invention.

FIG. 7 illustrates a seventh embodiment of a cutting element. Cutting element 70 includes a substrate 72, a first diamond portion 74, a metal carbide foil portion 76, and a second diamond portion 78. In this embodiment, there is a surrounding metal carbide foil portion similar to the second embodiment. However, in contrary to the second embodiment, the metal carbide foil portion is located on one side of the cutting element rather than in the center. Locating the second diamond portion on one side of the cutting element can provide the cutting edge of the cutting element with the benefits of the second diamond portion where the edge joining the top and peripheral surface of the cutting element is used as the cutting edge. In further embodiments, other locations for the surrounding metal carbide foil portion may be selected depending on the intended use of the cutting element. For example, placement may be determined based on the internal forces during use of the cutting element that can lead to crack propagation.

Figure 8:
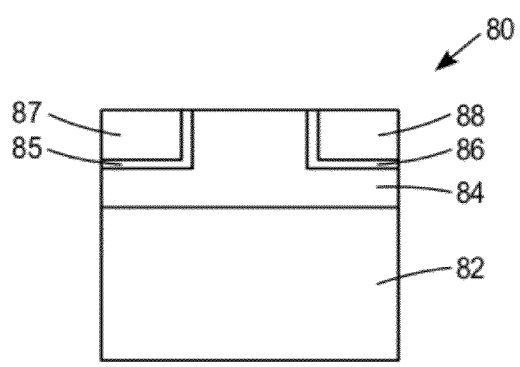
FIG. 8 shows a cross sectional view of a cutter according to an eighth embodiment of the invention.

FIG. 8 illustrates an eighth embodiment of a cutting element. Cutting element 80 includes a substrate 82, a first diamond portion 84, a first metal carbide foil portion 85, a second metal carbide foil portion 86, a second diamond portion 87, and a third diamond portion 88. In this embodiment, there are two surrounding metal carbide foil portions similar to the seventh embodiment. The first diamond portion 84 is in direct contact with the substrate 82, while a first metal carbide foil portion 85 surrounds a second diamond portion 87 on one side of the cutting element and a second metal carbide foil portion 86 surrounds a third diamond portion 88 on the opposite side of the cutting element. This embodiment provides many of the advantages described above with regard to the seventh embodiment. In addition, by having more than one diamond portion surrounded by a metal carbide foil portion, the cutting element can be indexable with the advantageous diamond portion at opposite sides of the cutting element.

In further embodiments, more than two surrounding metal carbide foil portions can be formed at different sides of the cutting element for additional indexability. In yet further embodiments, four or more surrounding metal carbide foil portion can be formed at different sides of the cutting element. In still further embodiments, surrounding metal carbide foil portions can be formed at different sides, in the center, or any other location in relation to the cutting element. Such locations can be determined, among other reasons, on the basis of size and shape of the cutting element, where diamond portions with less substrate particles are desired, and where metal carbide foil portions helping to prevent crack propagation are most useful.

Combinations of the above mentioned embodiments are also contemplated. For example, one or more planar metal carbide foil portions may be distributed within a surrounding metal carbide foil portion. Likewise, for example, one or more planar metal carbide foil portions may be distributed below or above surrounding metal carbide foil portions. Also, for example, combinations of nesting and non-nesting surrounding metal carbide foil portions may be distributed through out the diamond layer of a cutting element.

In further embodiments, a diamond compact without substrate may be formed in a similar manner as above herein for cutting elements that include a substrate. A standalone diamond compact can be formed as described above followed by a step of removing the substrate. Alternatively, the diamond compact can be formed in a similar method described above, except no substrate is placed in the reaction container. Instead, a separate binder element, which will melt during sintering and sweep into the diamond powder and react with the metal foil as described above. All elements and embodiments described above can also pertain to a diamond compact that is not connected to a substrate.

FIGS. 9 and 10 illustrate an exemplary method for forming a cutting element in accordance with at least the first embodiment. FIG. 9 illustrates a pictorial representation of an assembly step that includes obtaining a reaction container, for example, a metal cup 90. Placing a first diamond powder 92 with an optional first sintering aid 93 into the bottom of the metal cup 90. Forming a thin metal layer 94, in this case in the form of a planar sheet. Although as explained above, the thin metal layer may be in the form of a cup or other shape that can surround an object. The thin metal layer 94 may be a continuous metal sheet or a metal powder mixed with a pressing agent to form a continuous sheet. The thin metal layer 94 is placed in the metal cup 90 so as to separate the first diamond powder and optional first sintering aid from a second diamond powder 96 and optional second sintering aid 97 that is added after placement of the thin metal layer 94. Once all of the thin metal layers and diamond layers are added, then a pre-sintered substrate 98, which comprises a hard material and binder material, is placed in the metal cup 90 to form the final assembly 100. Particular interface patterns for the substrate can be designed to relieve the residual stress after HPHT process. An example of such an interface pattern is illustrated in FIG. 9.

FIG. 10 illustrates a pictorial representation of a sintering step. The final assembly 100 is placed in a HPHT sintering apparatus, such that heat 102 and pressure 101 are applied sufficient to sinter the diamond portions and integrally bond the diamond portions to the substrate. In particular embodiments, the HPHT sintering process subjects the assembly 30 to pressures of from about 40 to about 75 kilobars and temperatures of from about 1300° C. to about 1700° C. In certain embodiments, the pressure is from about 55 to about 70 kilobars, and the temperature is from about 1430° C. to about 1630° C.

During the sintering process, molten binder present in the pre-sintered substrate 98 sweeps into the second diamond powder 96. The sweeping molten binder 104 is represented by the arrows and moving line in FIG. 10. While the molten binder passes through the second diamond powder, the second diamond powder is sintered and becomes the first diamond portion 105. Once the molten binder reaches the thin metal layer 94 it reacts with the metal to form metal carbide foil 106. After the metal carbide foil 106 is formed, the molten binder is able to pass through to the first diamond powder 92. While the molten binder passes through the first diamond powder, the first diamond powder is sintered and becomes the first diamond portion. The fully sintered cutting element 108 formed by the process is similar to cutting element 10 of the first embodiment, including, for example, the same components.

In the above process, the reaction container may comprise molybdenum, niobium, tantalum, vanadium, hafnium, or tungsten, or combinations thereof. In certain embodiments, the reaction container is formed of the same metal as the thin metal layer. Alternatively, the reaction container may be formed of a metal different from the thin metal layer. In some embodiments, the reaction container has a double cup design. A double cup design has improved ability to maintain its integrity by better holding its shape and better avoiding deleterious reactions between the reactor elements and the materials used to form the cutting elements. In further embodiments, the metal container has a thick wall with a thickness, for example, from about 0.003 to about 0.01 inches, in order to more effectively withstand metal erosion and/or resist cracking.

Figure 13:
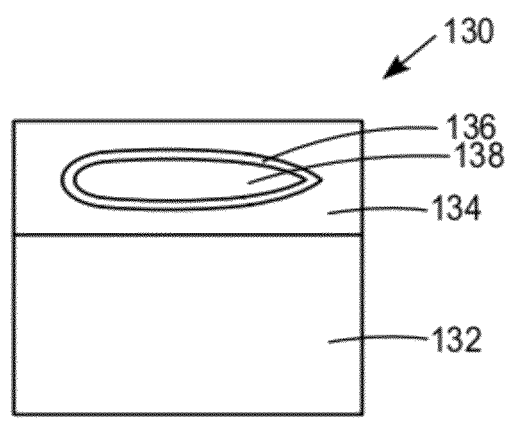
FIG. 13 shows a cross-sectional view of a cutter according a ninth embodiment of the invention.

FIG. 13 illustrates a ninth embodiment of a cutting element. Cutting element 130 includes a substrate 132, a first diamond portion 134, a metal carbide foil portion 136, and a second diamond portion 138. In this embodiment, the metal carbide foil portion 136 forms a pouch that surrounds the second diamond portion 138.

Figure 14A:
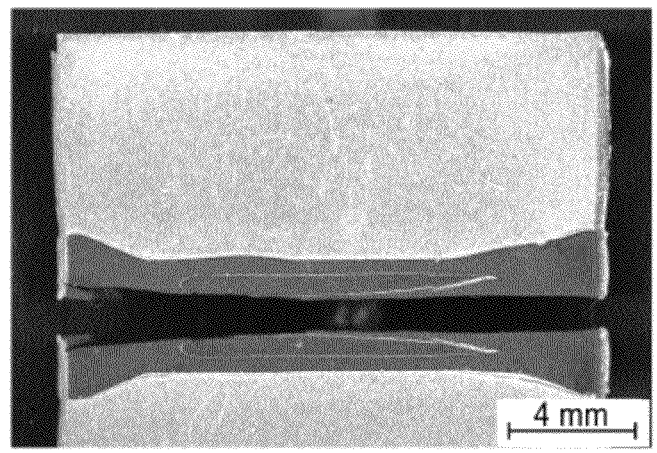
FIGS. 14A-14C are photographs of a cross-section of a cutter according to a tenth embodiment of the invention.
Figure 14B:
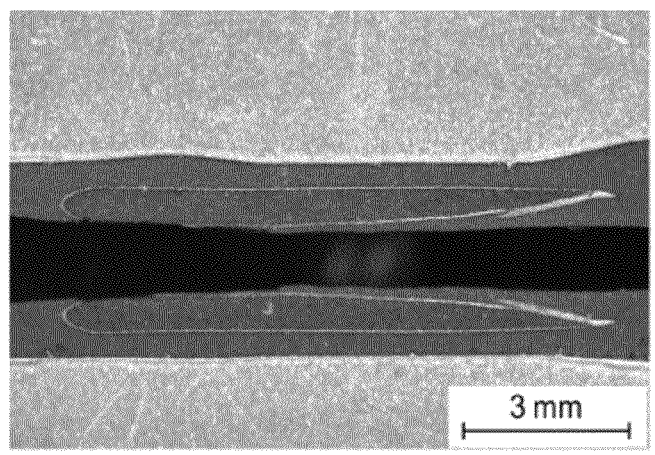
Figure 14C:
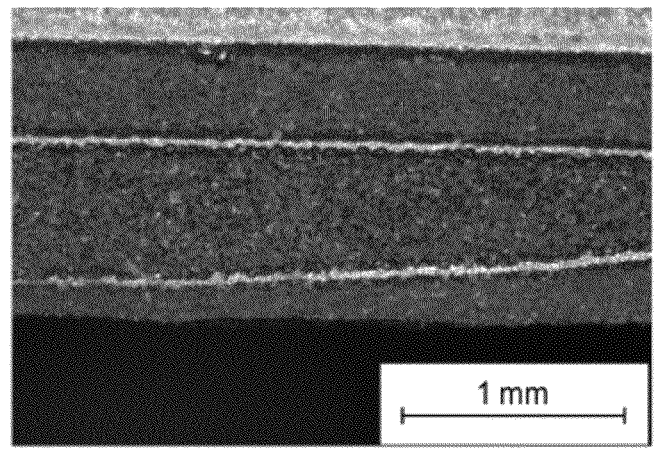

FIGS. 14A-C are photographs of a cutting element in accordance with a tenth embodiment of the invention. FIG. 14A shows a cutting element cut in half with the top surfaces of the two halves facing each other. The cutting element is similar to the ninth embodiment in that a metal carbide forming a pouch is found within the first diamond portion. The pouch surrounds a second diamond portion. FIG. 14B is a view of the cutting element of FIG. 14A at a higher level of magnification. FIG. 14C is at yet a higher magnification, and shows only a portion of one of the halves of the cutting element of FIG. 14A. The higher magnification of FIG. 14C clearly shows that the first diamond portion contains find diamond particles while the second diamond portion contains coarser diamond particles. This difference in the diamond particles is caused by the metal carbide foil layer forming a pouch that surrounds the second diamond portion.

Figure 15A:
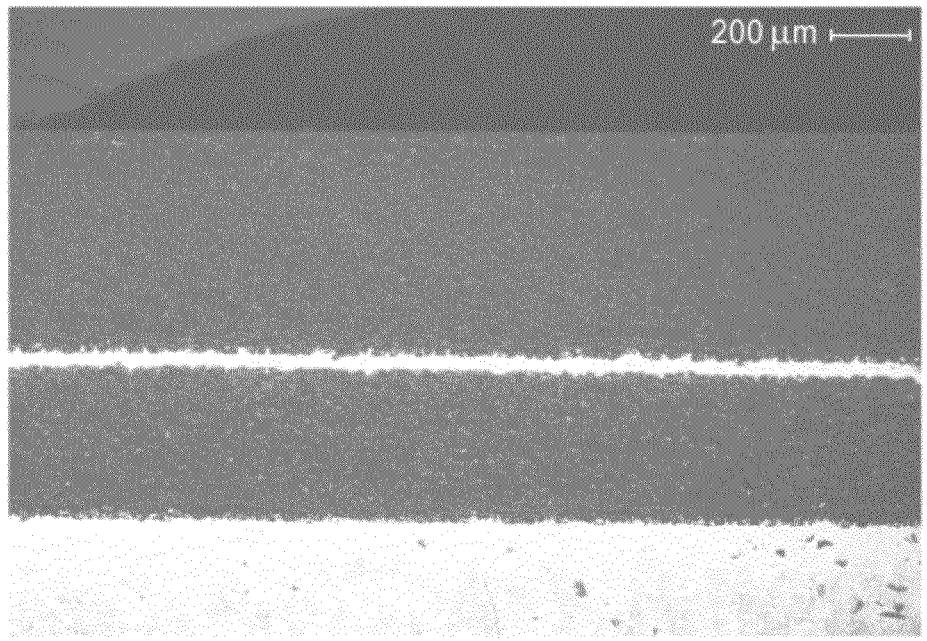
FIGS. 15A-15B are photographs of a cross-section of a cutter according to an eleventh embodiment of the invention.
Figure 15B:
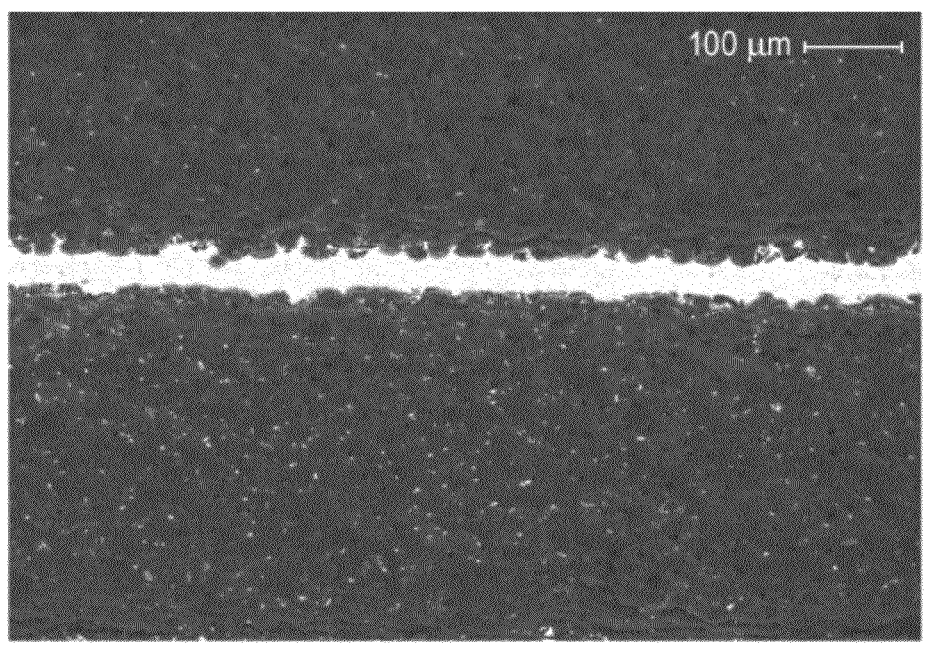

FIGS. 15A and 15B are photographs of a cutting element in accordance with an eleventh embodiment of the invention. FIG. 15A shows a cutting element cut in half with the top surfaces of one of the halves facing upward. The cutting element of FIG. 15A is similar to the embodiment of FIG. 1. The whitish color on the bottom portion of the photograph in FIG. 15A is the substrate, the gray portion immediately above the substrate is the first diamond portion, the thin white layer is the metal carbide foil portion, and the second gray layer above the metal carbide foil portion is the second diamond portion. The darker gray portion at the top of the photograph is merely the background on which the cutting element was photographed and is not a portion of the cutting element. FIG. 15B provides a higher magnification photograph of the cutting element of FIG. 15A. The higher magnification of FIG. 15B clearly shows that the first diamond portion contains more white dots than the second diamond portion. The white dots within the diamond portions are tungsten carbide. The tungsten carbide precipitated from tungsten dissolved in the cobalt binder in the substrate. As the molten cobalt moves from the first diamond portion to the second diamond portion during sintering it has to pass through the tantalum foil in the middle. There is a clear difference in the white dots in the second diamond portion, which indicates that the tungsten was "filtered out" as the cobalt passed through the tantalum foil.

Although described in connection with preferred embodiments thereof, it will be appreciated by those skilled in the art that additions, deletions, modifications, and substitutions not specifically described may be made without department from the spirit and scope of the invention as defined in the appended claims.

What is claimed is:

1. A diamond compact, comprising:
    at least a first and a second polycrystalline diamond (PCD) portions separated by at least one metal carbide foil portion, wherein the at least one metal carbide foil portion forms a cup that separates the at least first and second diamond portions and surrounds the second diamond portion.

2. The diamond compact of claim 1, wherein the at least one metal carbide portion comprises a layer of discrete pieces of metal or a continuous thin metal layer prior to sintering.

3. The diamond compact of claim 1, wherein the at least one metal carbide foil portion vertically separates the at least first and second diamond portions with the at least one metal carbide foil portion extending over an entire bottom surface of the second diamond portion.

4. The diamond compact of claim 1, wherein the compact comprises at least three diamond portions, wherein at least two metal carbide foil portions separate the respective diamond portions.

5. The diamond compact of claim 4, wherein the diamond portions and metal carbide foil portions form a vertical alternating composite with portions from a bottom surface to a top surface including: a first diamond portion, a first metal carbide foil portion, a second diamond portion, a second metal carbide foil portion, and a third diamond portion.

6. The diamond compact of claim 1, wherein the at least one metal carbide foil portion comprises molybdenum, niobium, zirconium, or tantalum or combinations thereof.

7. The diamond compact of claim 1, wherein the at least first and second diamond portions comprise polycrystalline diamond and a binder.

8. The diamond compact of claim 7, wherein the binder comprises Si, Co, Fe, or Ni, or alloys or combinations thereof.

9. A cutting element comprising:
    a substrate; and
    a diamond table comprising:
        at least a first and second polycrystalline diamond (PCD) portions; and
        at least one thin metal layer portion separating the at least first and second diamond portions, wherein the at least one thin metal layer portion forms a cup that separates the at least first and second diamond portions and surrounds the second diamond portion.

10. The cutting element of claim 9, wherein the first diamond portion is in contact with the substrate and the second diamond portion contains fewer substrate particles than the first diamond portion.

11. The cutting element of claim 9, wherein the substrate comprises carbide.

12. The cutting element of claim 11, wherein the substrate comprises tungsten carbide.

13. The cutting element of claim 11, wherein the substrate further comprises a binder that comprises Si, Co, Fe, or Ni, or alloys or combinations thereof.

* * * * *